June 28, 1960
E. MORF
2,942,409
POWER UNIT FOR WATCHES
Filed March 12, 1957
3 Sheets-Sheet 2
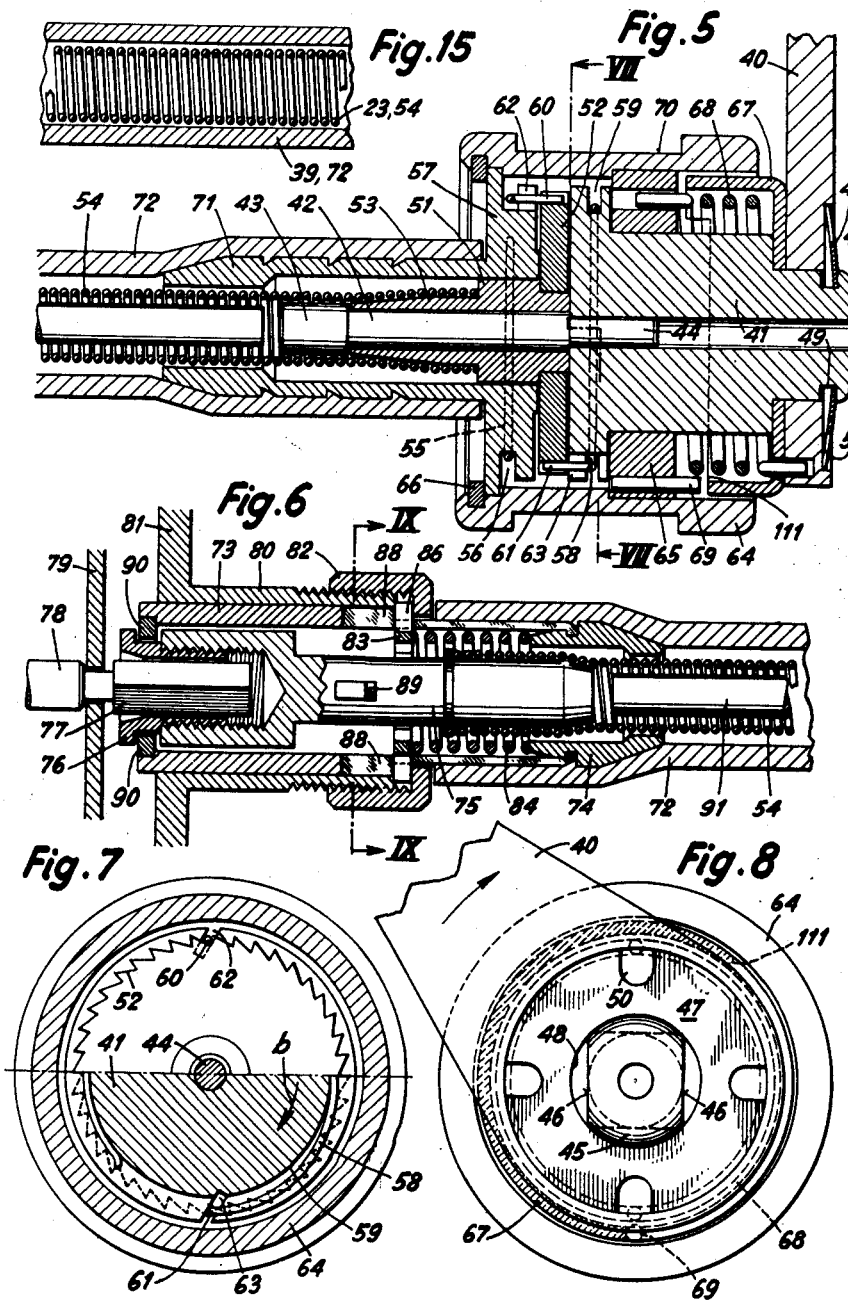

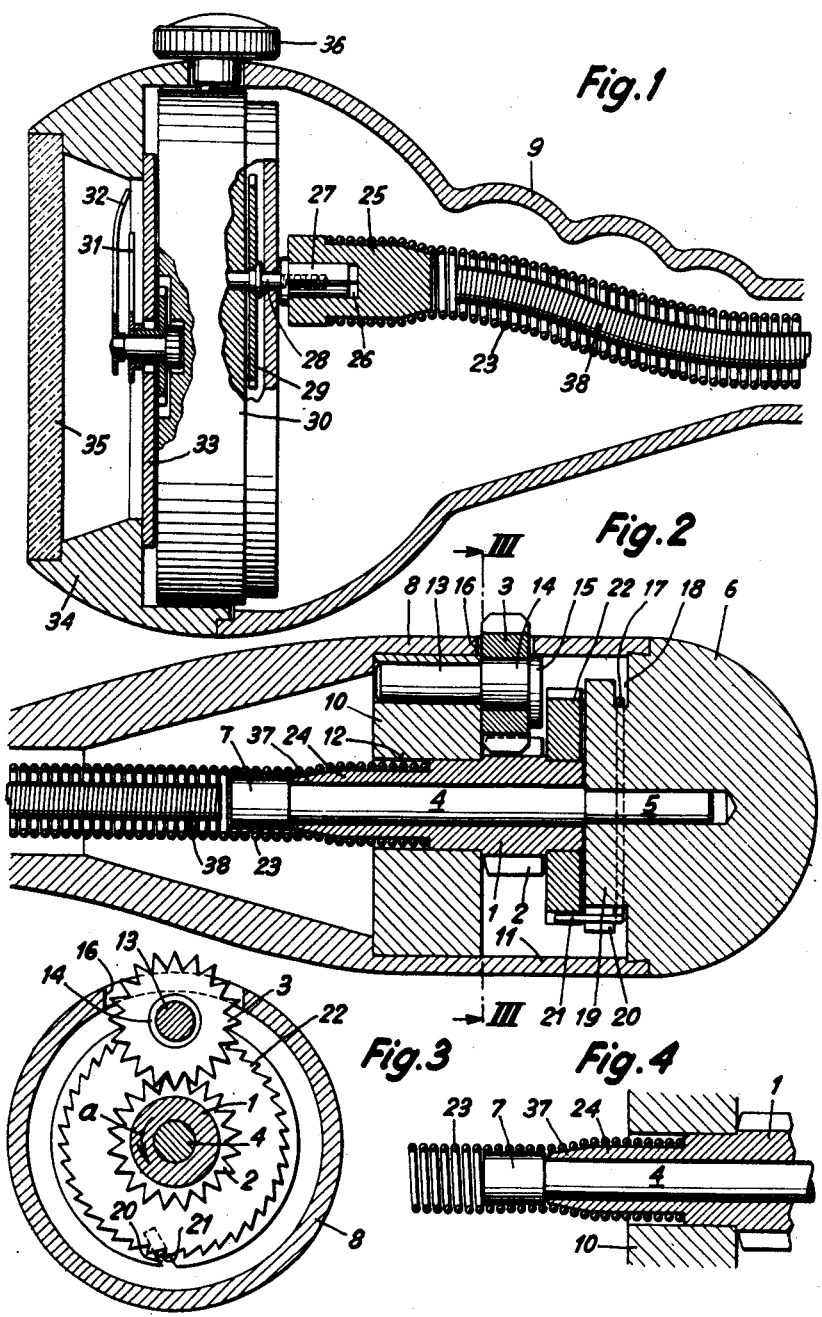

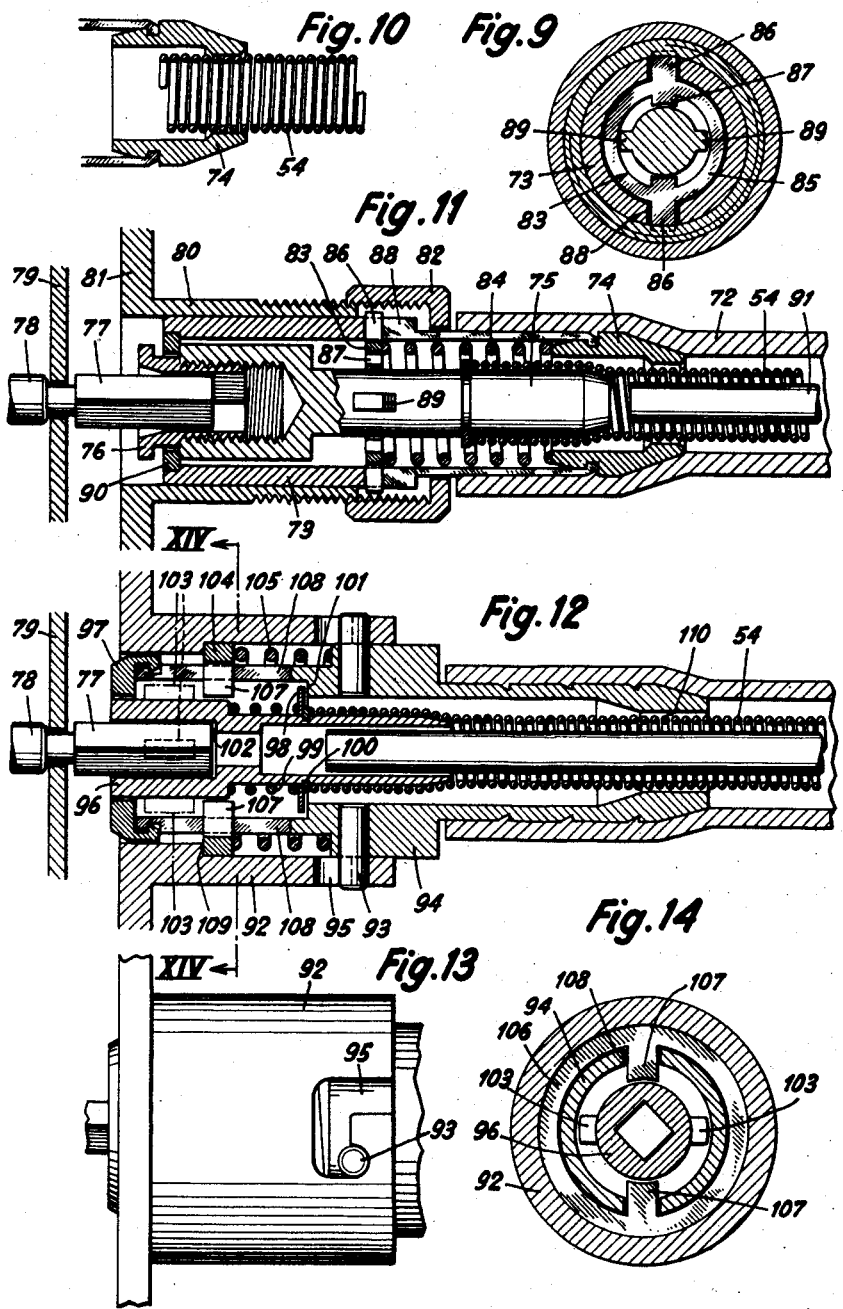

United States Patent Office 2,942,409
Patented June 28, 1960

---

2,942,409

POWER UNIT FOR WATCHES

Ernest Morf, Beauregard 15, La Chaux-de-Fonds, Switzerland

Filed Mar. 12, 1957, Ser. No. 645,622

Claims priority, application Switzerland Mar. 15, 1956

8 Claims. (Cl. 58—46)

This invention relates to power units for watches, which can be used either with a manual winding mechanism, for instance in a wrist-watch, or with a selfwinding mechanism, for instance in a car watch.

The U.S. Patent 2,745,242 discloses a timepiece having a cylindrical coil-spring as power member, and a winding mechanism operable occasionally to wind up the said spring. In that timepiece the coil-spring has one end coaxially connected to an element of the winding mechanism which can rotate only in the winding direction of the spring so as to accumulate energy in this spring, and the other end coaxially connected to a rotatable element to drive it in rotation when the said winding mechanism has stored a sufficient quantity of energy in the coil-spring. The power spring of that timepiece is further arranged so that its tension always remains between a lower limit, at which the spring can no longer drive the element to which it is connected, before the winding mechanism accumulates energy in the spring again, and an upper limit beyond which the winding mechanism cannot wind up the spring. That timepiece eventually comprises a Bowden wire located in the coil-spring and extending throughout the latter. That Bowden wire is fixed at one end to the element driven by the coil-spring, and it avoids the spring windings overlapping and entangling when the spring is wound up.

In that timepiece the spring is coiled up so that its windings are in contact with one another already when the spring is at rest, so that the latter becomes longer and longer when it is wound up by torsion.

Since both ends of the spring are attached to rotatable elements journalled within frames which are fixed with respect to one another, the spring obviously forms a curve more and more sinuous between these two movable elements when it is wound up. Accordingly, the Bowden wire part comprised between these two movable elements also becomes longer and longer, and there is the axial displacement of the free wire end with respect to the winding element which is used to limit the spring tensions. For this purpose two stops are provided to limit the axial displacements of said free wire end in either direction.

However, in a spring of this type, the windings are compressed so strongly against one another, when the spring is wound up, that adjacent windings become rigidly fixed to one another. In these conditions the spring driving momentum happens to decrease so much that the spring can no longer drive the mechanism to which it is connected.

In my U.S. Patent 2,771,159 I disclosed an improved winding mechanism in which too great a compression of the spring windings against one another, when the spring is wound up, is completely avoided. The stop means used thereby to avoid the spring tension decreasing below a predetermined limit do not depend on the axial displacements of said Bowden wire in one direction. These displacements are only used in the other direction, to avoid overtensioning the spring. For this purpose, the spring windings must, however, nevertheless come in contact with one another when the spring tension approaches its upper limit.

The power unit disclosed hereinafter constitutes a new improvement of the construction described in the U.S. Patent No. 2,745,242. The means which avoid here overtensioning the spring do no longer involve any contact of the spring windings with one another.

It is accordingly an object of the invention to journal the movable element of the winding mechanism, to which the powder spring is connected, on a fixed axle having a cylindrical portion extending out of said movable element, within some windings of the coil-spring adjoining the winding element, and to adjust the sizes of this cylindrical axle portion with respect to the spring diameter so that the spring encompasses said cylindrical portion before the spring windings come in contact with one another, when the spring is wound up completely.

As soon as the spring encompasses said cylindrical axle portion, the winding element and its axle are angularly fixed to one another, thus avoiding said winding element moving further on and preventing the spring from overtensioning.

Like in the patent and in the co-pending application mentioned above, the spring of the power unit according to this invention can also be fixed to the movable element of the winding mechanism and to the driven element by merely engaging both its ends on sleeves having a diameter somewhat larger than that of the spring at rest.

The axle on which the winding element is journalled can be fixed either to the winding mechanism frame or to an oscillating member.

In the first case, the winding element can be arranged so as to enable winding up the spring manually, and the power unit can advantageously be used in particular in a wristwatch of the type described in the co-pending application Ser. No. 565,480. In the second case, the oscillating member can be driven automatically, and the power unit according to the second variant indicated above can be advantageously used in a car watch of the type disclosed in the U.S. Patent No. 2,745,242, as well as in the U.S. Patent 2,771,159.

Another advantage of the power unit according to this invention resides in the fact that it is no more necessary to fix the said Bowden wire, extending within the spring, to the driven element, since the means which limit the spring tension in both directions do no more depend on this wire. Energy of the coil-spring is accordingly no longer used for rotating said Bowden wire together with the driven element.

If the coil-spring extends within a sheath or a tube having a diameter small enough with respect to that of the spring, the said Bowden wire can even be dispensed with. A sheath made as small as possible actually prevents the spring windings from overlapping and entangling, when the spring is wound up.

Further objects of the invention will become apparent in the course of the following description.

The drawings annexed to this specification show, by way of example, some embodiments of the power unit according to the invention and they illustrate, by way of example, two interesting applications of the said unit.

These two applications of said power unit are represented in Figs. 1 to 4 and 5 to 14, respectively, whereas Fig. 15 is a longitudinal part sectional view of a variant of the power unit represented in the foregoing figures, which may be used with either one of said applications.

In the drawings:

Figs. 1 and 2, which should be placed one at the side of the other, rather than one above the other, are each a longitudinal section of a wrist-watch part, said wrist-watch comprising a power unit according to the invention;

Fig. 3 is a transversal cross-section along line III—III of Fig. 2;

Fig. 4 shows some parts of Fig. 2 in another position;

Figs. 5 and 6, which should be placed side by side like Figs. 1 and 2, represent a second embodiment of the power unit according to the invention, these figures showing each a longitudinal section of one part of the power unit;

Fig. 7 is a cross-section of the power unit part represented in Fig. 5, along the broken line VII—VII, whereas Fig. 8 is a view from the right of Fig. 5;

Fig. 9 is a cross-section of the power unit part represented in Fig. 6, along line IX—IX;

Fig. 10 is a partial view of some elements of Fig. 6 in another operating position;

Fig. 11 is a longitudinal section analogous to that of Fig. 6, in which the power unit according to the invention is partly removed from the driven mechanism;

Fig. 12 shows a part analogous to that of Fig. 6 of another embodiment of the power unit according to the invention;

Fig. 13 is a partial plan view of some elements of Fig. 12; and

Fig. 14 is a cross-section of Fig. 12 along the broken line XIV—XIV; and

Fig. 15 is a fragmentary sectional illustration of a detail of the structure of the invention.

The power unit of the wrist-watch represented in Figs. 1 to 3 comprises a winding mechanism (Fig. 2) consisting of a sleeve 1 provided with a toothing 2 cut in a larger portion thereof, and a gear 3 meshing with the sleeve toothing 2. The sleeve 1 is rotatably mounted around an axle 4 having a part 5 pressed into a corresponding bore of a cap element 6. The sleeve 1 is axially held in place on axle 4 by a cylindrical portion 7 of the latter. The cap element 6 is fixed with snap fit to an enlarged portion of a wrist-band like that which is represented in the co-pending application Ser. No. 565,480. This wrist-band actually consists of a hollow ring surrounding the wrist and comprising two enlarged portions 8 and 9 at both ends.

A plate 10 pressed with force fit into a lodging 11 of portion 8 of the wrist-band is provided with a central boring 12 constituting an outer bearing for the sleeve 1. A stud 13 comprising a journalling surface 14 and a head portion 15 is set in a bore of plate 10 so that the gear 3 may freely rotate around the journalling surface 14. This gear 3 extends through an opening 16 (Figs. 2 and 3) provided in the side wall of the enlarged wrist-band portion 8, so that this gear may be actuated from outside the wrist-band.

A ratchet mechanism prevents the sleeve 1 from rotating in the direction opposite to that of arrow $a$ (Fig. 3). This ratchet mechanism actually comprises a resilient wire having an annular portion 17 located in an annular groove 18 provided in a cylindrical portion 19 of the cap member 6. A slot 20 provided at the periphery of the projection 19 forms a passage for the cranked end 21 of said resilient wire, said cranked wire end extending in a direction perpendicular to the plane defined by the annular wire portion 17. The wire end 21 extending beyond the projection 19 of cap member 6 co-operates with the ratchet teeth provided at the periphery of a disc 22, which is pressed with force fit on to the sleeve 1.

Fig. 3 shows that the slot 20 does not extend radially, but in an inclined direction, so that the radial tooth faces of the disc 22 keep the wire end 21 in engaging position by thrusting this wire end against a side wall of slot 20, thus avoiding any rotation of disc 22 in the direction opposite to that of arrow $a$.

Since disc 22 adjoins the cap member projection 19, the wire end 21 is only subjected to shearing between the wall of slot 20 against which it bears, and the radial tooth face of disc 22 it is engaging.

When the sleeve 1 together with disc 22 are driven in the direction of arrow $a$ by means of pinion 3, the inclined tooth faces of disc 22 successively push the wire end 21 out of their path. The two movable elements 1 and 3 constituting the winding mechanism of the power unit shown in Figs. 1 to 3 can thus only rotate in the direction allowed by the ratchet mechanism comprising the wire (17, 21).

The power member of the unit represented is constituted by a coil-spring 23 having one end engaged on to a portion 24 of sleeve 1. The outer diameter of portion 24 is somewhat larger than the inner diameter of the spring windings, when the spring is at rest, i.e. when it is completely unwound.

The other end of spring 23 is engaged on to a sleeve 25 analogous to sleeve portion 24 (Fig. 1). The sleeve 25 is provided with a square opening 26 to receive a member 27 of corresponding shape. This member 27 is screwed on the threaded end of axle 28 of the first gear 29 of a timepiece movement 30 comprising a gear train, an escapement mechanism, and an indicating device comprising the hour and minute hands 31 and 32 rotating opposite a dial 33. This train of gear, the escapement mechanism and the said indicating device are supported by the frame of the movement 30, which is set in a casing comprising a bezel portion 34, said casing closing the enlarged wrist-band portion 9. The bezel portion 34 carries a crystal 35 located approximately in a plane perpendicular to the axis of the wrist-band ring connecting both enlarged portions 8 and 9 represented in Figs. 2 and 1, respectively.

Like in the case of the wrist-watch disclosed in the co-pending application Ser. No. 565,480, the hands 31 and 32 can be set by means of a button 36 located outside the movement case.

Since the power unit of the watch described above is not located in the movement 30, this watch has also the advantages mentioned already in the co-pending application Ser. No. 565,480.

The function of the power unit represented in Figs. 1 to 3 is analogous to that of the power mechanism represented in the copending application Ser. No. 565,480.

Although the spring 23 only frictionally engages the sleeve portions 24 and 25, it is nevertheless rigidly fixed thereto, when the winding mechanism shown in Fig. 2 is actuated in the direction of arrow $a$ in Fig. 3, this direction obviously corresponding to that in which the windings of spring 23 are coiled up. The spring is thus wound up by torsion and the energy accumulated therein is transformed into a driving momentum exerted on the axle of element 29 by means of sleeve 25 and piece 27.

When the spring 23 is wound up more and more by the mechanism of Fig. 2, the diameter of the spring windings always decreases and the number of these windings increases. The spring 23 is, however, arranged so that its windings do not come in contact with one another before the spring encompasses axle portion 7. Fig. 4 shows the spring 23 completely wound up. Some of its windings firmly encompass the sleeve portion 24 and the axle portion 7, so that the sleeve 1 and its axle 4 are angularly fixed to one another by means of spring 23. Since axle 4 is fixed to the cover 6 of the enlarged wrist-band portion 8, the sleeve 1 and the pinion 3 are completely immobilized.

To avoid any deformation of the spring windings comprised between the cylindrical portion 24 and the axle portion 7 a truncated conical portion 37 is provided therebetween. The larger end of portion 37 has the same diameter as the cylindrical sleeve portion 24, and the smaller end of portion 37 has the same diameter as the axle portion 7.

The axle portion 7 thus constitutes an absolutely safe protection of the spring 23 against overtensioning upon a manual actuation of pinion 3.

Since the sizes of this portion 7 are chosen so that the spring 23 encompasses this portion before its windings come in contact with one another, the spring 23 no longer requires any lubrication.

When the spring 23 is wound up as shown in Fig. 4, it unwinds itself slowly by driving the watch mechanism until its driving momentum becomes too small.

Experiments have shown that the energy accumulated in that spring suffices to drive the watch movement 30 during three days, even if the movable element 29 is constituted by the great or second wheel, which were located in an eccentric position with respect to the watch movement.

In the embodiment represented in Figs. 1 to 3 overlapping and entangling of the windings of spring 23 are prevented by means of a Bowden wire 38 freely extending within spring 23 between the axle portion 7 and the sleeve 25.

While the Bowden wire used in the watch described in the co-pending application Ser. No. 565,480 was fixed to the driven element, the wire 38 described above is not driven in rotation with the movable element 29. The whole energy of spring 23 is accordingly transmitted to element 29 and the wire 30 does not dispel any part of that energy.

In a variant shown in Fig. 15, the wire 38 can even be dispensed with. That figure shows a ring part 39 of the wrist-band, which is situated between the enlarged end portions 8, 9 thereof. The spring 23 is completely unwound and it will be observed that the inner diameter of the ring 39 is only a little bit larger than the outer diameter of the spring windings, so that the ring 39 prevents these windings from overlapping and entangling even when the spring is completely wound up, and when the diameter of its windings has become a little smaller.

In the second embodiment of the power unit according to the invention (Figs. 5 and 6) the winding mechanism is represented in Fig. 5 and it is arranged so that it may be actuated by means of an oscillatory member comprising a lever 40, a body member 41 and a shaft 42. Like in the first embodiment the shaft 42 is provided with a larger front portion 43 and a rear portion 44 pressed with force fit in a bore of body member 41. This body member 41 is provided with a cylindrical rear projection 45 on which two diametrically opposite flat portions 46 are provided as represented in Fig. 8. The lever 40 is provided with an opening corresponding exactly to that of projection 45, so that the lever 40 is angularly fixed to the body member 41, when it is engaged on the projection 45. The lever 40 is axially held in place on this projection 45 by means of a yieldable curved washer 47, also provided with a central opening 48 (Fig. 8) having the same shape as projection 45. A circular groove 49 cut in the projection 45 holds the washer 47 axially in place on the projection 45 after this washer has been turned through an angle of 90° with respect to its position of engagement on projection 45. Fig. 8 shows the retaining position of this washer. Four notches 50 are cut at the periphery of the washer 47 to enable seizing this washer with an appropriate tool for rotating it in either direction when assembling or disassembling the same.

As in the first embodiment the shaft portion 43 axially holds a sleeve 51 in place on shaft 42 so that said sleeve can freely rotate around this shaft. A ratchet wheel 52 is also fixed on the sleeve 51 comprising a portion 53 on which an end of the power-spring 54 is engaged.

Two ratchet mechanisms analogous to that which is located between the movable element 22 and the projection 19 in Fig. 2 are used in this second embodiment. One of these ratchet mechanisms comprises a spring 55 located in an annular groove 56 of a fixed element 57, whereas the other ratchet mechanism is constituted by a spring 58 located in an annular groove 59 provided around the front portion of body member 41. The ends 60 and 61 of both springs 55 and 58 cooperate with the toothing of wheel 52 by passing each through a slot 62, 63 as shown in Fig. 7. These slots 62 and 63 are inclined like slot 20 of the first ratchet mechanism described with the embodiment of Figs. 1 to 3.

These two ratchet mechanisms function as follows: When the body member 41 rotates in the direction of arrow $b$ (Fig. 7), the end 61 of spring 58 butts against a radial tooth face of wheel 52 and it remains in contact therewith because of the centripetal thrust exerted by a side wall of slot 63 on the spring end 61. The movable element 52 is thus driven in the direction of arrow $b$ by the oscillating member comprising lever 40 and body member 41. This movement of wheel 52 is possible, since the spring end 60 jumps over the teeth of wheel 52 after sliding on the inclined faces of these teeth. The spring end 60 avoids wheel 52 rotating in the direction opposite to that of arrow $b$, so that the spring end 61 merely jumps over the teeth of wheel 52, when the oscillating member (40, 41) rotates in the direction opposite to that of arrow $b$.

The wheel 52 and the sleeve 51 are thus always rotating in the same direction, which corresponds to that in which the spring 54 is coiled up, although member (40, 41) moves alternately in either direction.

It should be observed that both spring ends 60 and 61 do not risk to come in contact with one another, although they are extending each over the whole width of the teeth of wheel 52, since the oscillating member (40, 41) always remains within a predetermined angle. The said spring ends need thus only be placed in such angular positions with respect to said predetermined angle that any contact with one another will be avoided.

The body member 41, the sleeve 51 and the wheel 52 are located in a casing 64. A ring 65 pressed with force fit into this casing serves as axial abutting means and as bearing means for body member 41. As regards element 57 it serves as cover for this casing. This cover is angularly fixed to the casing 64 by means of a pin not shown. Eventually, this cover 57 is axially held in place in casing 64 by means of a split ring 66 engaged in an inner groove provided at the front end of casing 64.

A bell-shaped part 67 fixed to body member 41 between a shoulder thereof and the lever 40 serves as lodging for a return-spring 68 bent between the fixed ring 65 and the lever 40 to urge the latter towards the position represented in Figs. 5 and 8, in which a wall of a cutout 111 butts against a pin 69 fixed to the ring 65. The action of this spring 68 on lever 40 is obviously adjusted so that the lever 40 winds up the power spring 54, when it is moving against the action of the return-spring 68.

An annular groove 70 provided at the periphery of casing 64 may receive a metal strip for fixing the casing to a support. The cover 57 is eventually made with a tubular projection 71 on which a sheath 72 is rigidly fixed.

The spring 54 extends within the sheath 72 towards the power unit part represented in Fig. 6. This power unit part comprises a body member formed by a tubular piece 73 fixed to a receptacle 74. The sheath 72 is also rigidly engaged on a part of that body member. The spring 54 extends through the receptacle 74 and its front end is engaged on a cylindrical portion of a piece 75 rotatably mounted within body member (73, 74).

A piece 76 provided with a central square opening is screwed into a tapped bore provided in the front face of piece 75. Piece 76 is engaged on a square portion 77 formed at the end of the axle 78 of the first gear of the watch movement, said axle being journalled in a bridge 79 of this movement. The piece 76 and the square portion 77 are arranged so as to fix piece 75 angularly to axle 78 for transmitting the driving momentum of the spring 54 to the first gear of the timepiece movement.

Piece 73 of the power unit part which must be connected to the said timepiece movement, is adjusted in a tubular projection 80 of the casing 81 in which the watch movement is located. That front part of the said power unit is removably fixed to the projection 80 by means of a nut 82.

To avoid the spring 54 unwinding completely every time the front part of the power unit represented in Fig. 6 is disconnected from the timepiece casing 81, an automatic latching device of piece 75 is located in the body member (73, 74) of that front part of the power unit.

This device comprises a latch 83 set under the action of a spring 84 bearing against the piece 74. The latch 83 shown in detail in Fig. 9 consists of a ring 85, two outward diametrically opposite ears 86 and two inner ears 87. The ears 86 are engaged in longitudinal diametrically opposite slots 88 provided in the piece 73, thus fixing the latch angularly to the tubular piece 73. As regards ears 87 of latch 83 they cooperate with two noses 89 of the movable piece 75.

When the front part of the power unit, represented in Fig. 6, is connected to the casing 81, the two outer ears 86 of latch 83 bear against the rear end of the tubular projection 80, so that the spring 84 is bent and the inner ears 87 are removed from noses 89. Piece 75 can thus rotate freely with respect to body member (73, 74).

To remove the said power unit part from the casing 81 the nut 82 need only be unscrewed. Fig. 11 shows that nut almost completely removed from projection 80. The ears 86 are now in contact with the bottom faces of slots 88 under the action of spring 84. The ears 87 of latch 83 are in latching position with respect to the noses 89 of piece 75. In the position of Fig. 11 the piece 75 is however still connected to the square portion 77 of axle 78 by means of piece 76, so that during this first disengagement of nut 82, the piece 75 cannot rotate freely under the action of the power-spring 54.

When the nut 82 is completely disengaged from the tubular projection 80 and when the piece 76 is disengaged from the square 77, the movable piece 75 is completely free, but it cannot rotate more than through an angle of 90° under the action of power-spring 54, before its noses 89 butt against the inner ears 87 of latch 83.

The latching device described is thus automatic; it avoids the coil-spring 54 suddenly unwinding completely.

In order to connect that power unit part represented in Fig. 6 to the casing 81, the piece 76 need only be engaged on the square portion 77 and the nut 82 screwed onto the threaded projection 80 of the casing 81. When screwing this nut the body member (73, 74) enters more and more the tubular projection 80 of casing 81, and the latch 83 is gradually pushed backward with respect to that body member, against the action of spring 84, thus freeing the inner ears 87 from noses 89.

The piece 75 is axially held in place in the body member (73, 74) by means of a ring 90 fixed at the front end of the tubular piece 73.

The power unit disclosed above is intended for use particularly in a car watch of the type described in the U.S. Patent No. 2,745,242, as well as in the U.S. Patent 2,771,159.

The means provided, however, to maintain the spring tension between two well determined limits are not the same in the embodiment described above as in those described in either of said patents, at least with regards the upper tension limit of the power spring 54. It is here, of course, the shaft portion 43 (like axle portion 7 of the first embodiment), that avoids the spring 54 overtensioning. The outer diameter of shaft portion 43 is actually chosen with respect to the inner diameter of the windings of the spring 54, so that the latter encompasses said portion 43 before coming in contact with one another. When the spring 54 encompasses the sleeve 53 and the shaft portion 43, the shaft 42 and the sleeve 51 together with the wheel 52 are angularly fixed to one another. If lever 40 is then actuated in the direction of arrow b (Fig. 7), it drives the sleeve 51 at most through an angle of 180° in the winding direction of the spring 54, but the return-spring 68 can no longer return the lever 40 in the position in which it butts against the pin 69, because the ratchet mechanism constituted by the spring 55 prevents the movable element 52 from rotating in the direction opposite to that of arrow b, and because the shaft 42 and consequently the body member 41 and the lever 40 are angularly fixed to the the sleeve 41 by means of the power-spring 54, which encompasses firmly the sleeve portion 53 and the cylindrical shaft portion 43.

If the winding mechanism represented in Fig. 5 is located in a motor car, near a movable element thereof, and if this winding mechanism is connected by means of a small chain to the lever 40 as with the watches of the U.S. Patent 2,745,242 and of the U.S. Patent 2,771,159, it will be observed that the winding operation may be suspended while still leaving the movable element of the car moving alone without driving the lever 40.

Like in the constructions disclosed in the U.S. Patent 2,745,242, as well as in the U.S. Patent 2,771,159, the driving action of the spring 54 on the watch movement is suspended as soon as the spring tension has decreased down to a predetermined limit, thus avoiding the spring complete unwinding. For this purpose, the inner diameter of the piece 74 (Fig. 6), through which the power spring 54 passes, is merely provided with respect to the outer diameter of this spring so that the windings thereof come in contact (as shown in Fig. 10) with the walls of the opening of that piece 74 before the spring 54 is completely unwound.

To avoid overlapping and entangling of the coils of spring 54, a Bowden wire 91 may be located in the spring windings. The sheath 72 may also be chosen small enough like in the variant represented in Fig. 15, thus avoiding said Bowden wire. In both cases, the spring 54 has no more to drive a wire fixed to the driven element and rotating therewith, like in the embodiments disclosed in the U.S. Patent 2,745,242, as well as in the U.S. Patent 2,771,159.

The casing 64 can be fixed in particular to the carriage-work of the motor car, above the axle of a front wheel, the small chain attached by one end to the lever 40 thereby having its other end connected to a movable rod ensuring the yieldable suspension of said car wheel with respect to the carriage-work.

Figs. 12 to 14 show another embodiment of the power unit part, which is connected to the casing of the timepiece movement. Instead of fixing that part to a tubular projection of the casing by means of a nut, it is fixed to a tubular projection 92 by means of a bayonet joint comprising two diametrically opposite pins 93 fixed on a body member 94 of that power unit part. As shown in Fig. 13, the pins 93 are engaged each in a slot 95 of the tubular projection 92.

When the power unit part represented in Fig. 12 is not connected to the watch movement, the movable piece 96 of that power unit part, to which the front end of the power spring 54 is attached, is axially held in place in the body member 94 by a ring 97 fixed thereto. The radial play of that piece 96 is limited, on the one hand, by the ring 97, and, on the other hand, by a ring 98 axially thrust by a coil-spring 99 against a split ring 100 set in an annular groove of piece 96. As regards the axial play of piece 96 when the said power unit part is connected to the casing of the timepiece movement, this play is limited, on the one hand, by an inner shoulder 101 of body member 94, against which the ring 98 butts, and, on the other hand, by the rear face of the square portion 77, against which butts the bottom 102 of a corresponding opening provided in piece 96. It is of course preferable to use that rear face of axle 78 as axial abutting means, rather than to use the ring 97. A wear due to the friction of projections 103 of the piece 96 on the ring 97 is thus avoided.

To disengage the pins 93 from the slots 95 of the casing projection 92, it will be observed that the body member 94 must first be pushed towards the watch movement. This movement, however, would not be possible if the ring 98 were not yieldably mounted on the piece 96 and were replaced for instance by a rigid shoulder, because the axial play of piece 96 between the shoulder 101 and the rear face of the square portion 77 would not be sufficient to enable said disengaging movement of body member 94. The ring 98 axially movable along piece 96 and the spring 99 thus enable disengaging the pins 93 from the slots 95, since the shoulder 101 can push and displace the ring 98 against the action of spring 99.

The power unit part represented in Figs. 12 and 14 also comprises an automatic latching device of the power spring. That device comprises a latch 104 and a coil-spring 105 urging the latch towards the left in Fig. 12.

The latch 104, shown with more details in Fig. 14, consists of a ring 106 made with two diametrically opposite inner ears 107. This ring 106 is shiftably mounted on body member 94, to which it is angularly fixed by means of the ears 107, which extend through two longitudinal slots 108 provided in body member 94. Besides that guiding function the ears 107 obviously also ensure latching the movable piece 96 by cooperating with projections 103 of the latter.

When the power unit part of Fig. 12 is connected to the timepiece casing, an inner shoulder 109 of the tubular casing projection 92 keeps the latch 104 against the action of the spring 105 in such an axial position with respect to body member 94, that the projections 103 are free from the ears 107, thus allowing the piece 96 rotating freely together with axle 78.

When the power unit part represented in Fig. 12 is disconnected from the timepiece casing by disengaging the pins 93 from the slots 95, the shoulder 109 allows the latch 104 moving forward along body member 94 under the action of spring 105 until the latch butts against the ring 97 and the ears 107 are situated opposite the projections 103 It will be observed that the latch 104 comes in the said latching position well before the square portion 77 comes out of the front opening of the movable piece 96. As in the second embodiment, the piece 96 can move at most through an angle of 180° under the action of the power spring 54, when the body member 94 is disconnected from the timepiece casing.

When connecting the body member 94 to the movement casing, the shoulder 109 automatically disengages the movable piece 96 by keeping the latch 104 in a predetermined axial position against the action of spring 105. This shoulder does, however, not thrust the latch 104 backward with respect to body member 94, before the square portion 77 of axle 78 has entered the front opening of the movable piece 96, thus avoiding a sudden rotation of the latter under the action of power spring 54, which could obviously be completely wound up, when it is connected to the watch movement or disconnected therefrom As in the second embodiment the power spring 54 can no longer drive the watch movement when its tension has decreased down to a predetermined limit. This lower limit is actually constituted by the cylindrical wall 110 of the rear opening of body member 94. The diameter of that opening is chosen with respect to that of the coils of the spring at rest in the same manner as in the embodiment of Figs. 5 and 6.

While several embodiments of the invention have been described hereabove, it will be understood that various changes in the shape, sizes and arrangement of parts could be resorted to without sacrificing the advantages of the invention or departing from the scope of the subjoined claims.

I claim:

1. In a power unit for driving a first gear of a train, in combination: an oscillating rotatable member, a return-spring urging said oscillating member in one direction, a winding element, one-way coupling means between said oscillating member and said winding element to fix said oscillating member and said winding member to one another when the former turns in a direction opposite to said one direction; fixed stop means preventing the winding element from rotating in said one direction; a cylindrical power spring having one end connected to said winding element, and a coupling member affixed to the other end of said other spring, said coupling member being arranged so that it may be connected to said first gear, said power spring having its spring windings which extend between said winding element and coupling member wound around an elongated hollow space which is completely empty so that there is nothing in the space surrounded by said spring windings to prevent the spring windings from overlapping and entangling, and a tubular element surrounding said power spring and having an inner diameter only slightly larger than the outer diameter of the spring windings when the power spring is unwound so that said tubular element serves to prevent overlapping and entangling of the spring windings.

2. In a power unit for driving a first gear of a train of watch movement, in combination: an oscillating rotatable member, a return-spring urging said oscillating member in one direction, a winding element, one-way coupling means between said oscillating member and said winding element to fix said oscillating member and said winding element to one another when the former turns in a direction opposite to said one direction and fixed stop means preventing the winding element from rotating in said one direction; a cylindrical power spring having one end connected to said winding element, and a front part comprising a body member carrying means for removably fixing it to the watch movement, a coupling member fixed to the front end of said power spring, said coupling member being adapted so that it may be connected to said first gear, and latch means shiftably mounted on said body member and occupying a foremost position when said body member is disconnected from said watch movement and a rear position when said body member is connected to said watch movement, said latch means fixing said coupling member angularly to said body member, when said latch means are in said foremost position, and leaving said coupling member free from said body member when said latch means are in their rear position.

3. An assembly forming part of a power unit for driving a first gear of a train of a watch movement, said assembly comprising, in combination, a body member; means carried by said body member for removably fixing the same to the watch movement; a coupling member adapted to be connected to the first gear of the train; a power spring having an end fixed to said coupling member for driving the latter; and latch means shiftably mounted on said body member occupying a foremost position when said body member is disconnected from said watch movement and a rear position when said body member is connected to said watch movement, said latch means fixing such coupling member angularly to said body member, when said latch means are in said foremost position, and leaving said coupling member free from said body member when said latch means are in said rear position.

4. An assembly forming part of a power unit for driving a first gear of a train of a watch movement, said assembly comprising, in combination, an elongated coupling member adapted to be connected to the first gear; a power spring fixed at one end to said coupling member; an elongated hollow tubular body member in which said coupling member and at least the portion of said power spring connected thereto are housed for free rotation, said elongated body member being formed with at least one axial slot; a watch movement casing having a tubular projection in which said body member is received when said coupling member is connected to the first gear, said tubular projection having an annular surface surrounding said body member and directed toward the rear away from said watch movement; fixing means carried by said body member and cooperating with said tubular projection for removably fixing said body member in said tubular projection at a predetermined location along the common axis of said tubular projection and body member; a latch ring surrounding said axis and carried by said body member for axial movement with respect thereto, said ring having outside of said body member a portion engaging said annular surface of said tubular projection and said latch ring having a portion extending into said slot to prevent turning of said ring wtih respect to said body member, and said latch ring also having in the interior of said body member a latching portion located at a given radial distance from said axis; spring means carried by said body member and urging said latch ring axially toward the front end of said slot to a latching position, said coupling member having a latching projection at the same radial distance from said axis as said latching portion of said latch ring and axially aligned with said latching portion when said ring is in said latching position so that before the coupling member can be turned through a complete revolution by the power spring when the latch ring is in its latching position said latching projection will engage said latching portion of said ring so as to prevent further turning of said coupling member and unwinding of said power spring, said fixing means when attaching said body member to said tubular projection axially advancing said body member in said tubular projection in opposition to said spring means with respect to said latch ring while the latter engages said annular surface for advancing said latching projection axially beyond said latching portion to locate said latching ring on said body member in a rear non-latching position where said coupling member is released to said power spring, said coupling member entering into operative cooperation with the first gear before said latching projection moves beyond said latching portion.

5. An assembly as recited in claim 4 and wherein said latch ring surrounds said body member and wherein said latching portion of said ring is an extension of the portion of said ring which extends into said slot.

6. An assembly as recited in claim 5 and wherein said annular surface of said tubular projection is a shoulder of the latter and wherein said fixing means is in the form of a bayonet connection.

7. An assembly as recited in claim 4 and wherein said ring is located within said body member, has an outer radial projection forming the portion of said ring which extends into said slot and an inner radial projection forming said latching portion.

8. An assembly as recited in claim 7 and wherein said fixing means is in the form of a cap nut threadedly engaging said tubular projection and surrounding said latch ring, said body member being formed with a shoulder engaged by said cap nut and advanced toward said tubular projection during turning of said cap nut onto said tubular projection and said annular surface of said tubular projection being formed by an end face of the latter.

References Cited in the file of this patent
UNITED STATES PATENTS

| 502,884 | Grasset et al. | Aug. 8, 1883 |
| 973,854 | Busenbenz | Oct. 25, 1910 |
| 1,127,134 | Wehinger | Feb. 2, 1915 |
| 1,256,872 | Busenbenz | Feb. 19, 1918 |
| 1,472,936 | Pitman | Nov. 6, 1923 |
| 2,771,159 | Morf | Nov. 20, 1956 |